United States Patent [19]
Kolskog

[11] Patent Number: 5,005,497
[45] Date of Patent: Apr. 9, 1991

[54] DEEP BANDING KNIFE WITH ROD ATTACHMENT

[76] Inventor: Albert Kolskog, Box 56, McCord, Saskatchewan, Canada, S0H 2T0

[21] Appl. No.: 539,708

[22] Filed: Jun. 18, 1990

[51] Int. Cl.5 .......................... A01C 23/00; A01C 5/08
[52] U.S. Cl. ..................................... 111/123; 111/156; 172/726
[58] Field of Search ............... 172/720, 721, 722, 726; 111/123, 124, 156, 149, 118, 120, 152, 154, 155, 158

[56] References Cited

U.S. PATENT DOCUMENTS 3,749,177  7/1973  Keyser et al. ....................... 172/720

FOREIGN PATENT DOCUMENTS 636735   2/1962   Canada ................................ 111/152
973007   8/1975   Canada ................................ 111/158
224477  11/1924   United Kingdom ................. 172/726

*Primary Examiner*—Peter M. Cuomo
*Assistant Examiner*—Spencer Warnick
*Attorney, Agent, or Firm*—Adrian D. Battison; Stanley G. Ade; Murray E. Thrift

[57] ABSTRACT

A deep banding knife of the type comprising a bar of metal twisted so that an edge of the bar faces forwardly to define a cutting leading edge and including a material supply duct running down behind the bar for depositing material such as fertilizer into the furrow cut by the knife is modified by the addition of a transverse rod extending through the bar so as to be supported thereby. The rod is of a relatively short extent so that it is supported wholly by and independent of adjacent banding knives. The rod can be attached by a screw threaded coupling arrangement in which one cantilever part of the rod is threaded into a hole in the knife with a second part of the rod screwed onto a male portion extending from the first rod through the knife.

8 Claims, 1 Drawing Sheet

DEEP BANDING KNIFE WITH ROD ATTACHMENT

BACKGROUND OF THE INVENTION

This invention relates to a deep banding knife of the type which includes a knife element including means for mounting the knife element on a shank of an agricultural frame so that the knife element is carried with a plurality of other knife elements across the ground for forming furrows therein. Each of the knife elements has a leading edge facing forwardly of a direction of travel which is substantially vertical for cutting the furrow in the ground. Each knife element includes at least one material supply duct mounted on the knife element rearwardly thereof relative to the leading edge so as to deposit said material into the furrow as the knife element is moved forwardly in the ground.

Deep banding has become increasingly popular in recent years as farmers attempt to reduce the cultivation which is carried out on the land for purposes of improved soil conservation.

The deep banding knife is relatively narrow so that it forms a narrow furrow in the ground and carries behind the knife firstly a supply duct for fertilizer which projects to a position just behind the knife and just above the lowermost edge of the knife so that the fertilizer is deposited substantially at the base of the furrow. In many cases the fertilizer supply duct is a seed supply duct which is positioned a little further back and a little higher so that the seed falls into the furrow on top of some soil as it begins to fall back into the furrow thus spacing the seed a little above the deep banded fertilizer.

This arrangement is relatively satisfactory and is widely used in a seeding action particularly using air distribution devices for transmitting the materials from a central supply container on the agricultural frame to each of the deep banding knives.

However as the farmer attempts to reduce the amount of cultivation of the land, the deep banding knife becomes less satisfactory in that it tends to leave weeds between the separate furrows of the knife so that the weeds can flourish and compete with the crop.

A technique is of course well known using a sweep in place of the knife but in this case the deep banding effect is reduced in view of the relatively wide furrow that is formed and the inability of the sweep to reach the depths that is desirable by the deep banding knife.

Some attempts have been made to integrate the effect of the sweep with that of the deep banding knife by attaching to the sides of the deep banding knife fins in the form of the fins of a sweep which project outwardly to the sides and then rearwardly from the knife in the conventional sweep shape. However these devices have been found to be entirely unsatisfactory in that they do not remain attached and that they are relatively weak and prone to damage and in that their effectiveness is limited.

SUMMARY OF THE INVENTION

It is one object of the present invention, therefore, to provide an improved deep banding knife which acts effectively in the deep banding action to ensure that the materials are properly deposited in the ground at the required depths and at the same time provides a cultivating action to reduce weed infestation.

According to the invention, therefore, there is provided in a deep banding knife comprising a knife element including means for mounting the element on a shank and having a leading edge facing forwardly of a direction of travel which is substantially vertical for cutting a furrow in the ground, and a material supply duct mounted on the knife element rearwardly thereof relative to the leading edge so as to deposit said material into the furrow as the knife element is moved forwardly in the ground, the improvement of a horizontal rod member mounted on the knife element so as to extend transversely of the direction of travel and to project outwardly to each side of the knife element, the rod member being spaced above a lower most point of the leading edge and below a top edge of the knife element so as to run along the ground just below the surface on either side of the furrow.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
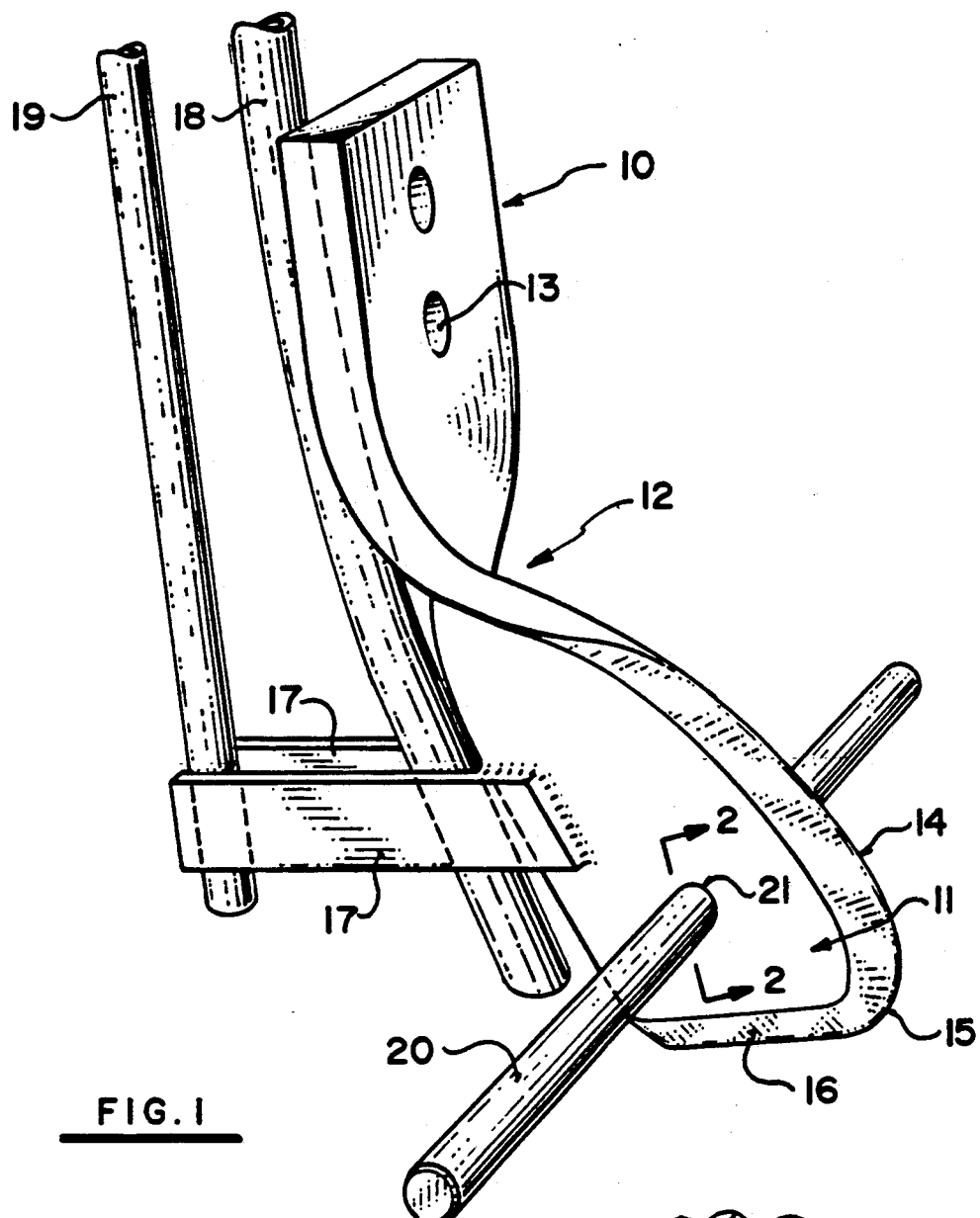
FIG. 1 is an isometric view of a deep banding knife according to the invention.

The deep banding knife is basically of conventional construction and is formed from a strip of metal having a width greater than the thickness thereof. The strip of metal is twisted at a centre section so that the width lies across the device in an upper part 10 of the knife and lies parallel to a direction of travel in a lower part of the device indicated at 11. The twisted section is indicated at 12. The upper portion 10 includes one or more holes 13 for attachment to the lower end of a shank (not shown) of conventional construction. The lower part 11 includes a leading edge 14 which extends from the twisted portion 12 down to a lowermost apex 15. The leading edge also follows along the underside of the end of the metal strip as indicated at 16. The leading edge portion 14 and 16 is formed from a harder material so that it can cut a furrow in the ground as a leading edge passes along the ground. The depth of the lower portion 11 is arranged to be generally of the order of 4 inches so that the lowermost apex 15 runs along the bottom of the furrow as it is formed with a depth of the furrow also being of the order of 4 inches.

On the sides of the lower part 11 is attached a pair of rearwardly projecting plates 17 which define a channel between the plates for receiving a first supply duct 18 and a second supply duct 19. The supply duct 18 is tucked directly behind the rear edge of the lower most portion of the knife and extends substantially to the base of the lower portion so that fertilizer material supplied from a central supply system (not shown) through the duct 18 falls to a position at the bottom of the furrow in a deep banding action.

The second supply duct 19 tends to be spaced 1 or 2 inches rearwardly of the first supply duct 18 and has a mouth at the lower end which is just beneath the plates 17 so that the seed tends to be dropped slightly higher and rearwardly of the base of the furrow giving a chance for soil to fall back into the furrow thus placing the seed closer to the surface of the ground and above the fertilizer.

The above description of a deep banding knife is of course entirely conventional and well known to one skilled in the art.

The above conventional knife is improved by the addition of a transverse rod 20 which projects through a hole 21 in the lower portion 11. The hole is positioned approximately midway across the width of the lower portion and is spaced from the lowermost apex 15 by a height of the order of 1.5 inches. The rod is formed from a suitable hardened material preferably steel rod which can be of the order of 0.75 inches in diameter. The rod has a length projecting outwardly from each side of the knife of the order of 4.5 inches which in practice is sufficient so that the end of the rod just overlaps with the end of a rod of a next adjacent knife of an agricultural apparatus of this type.

In one arrangement, the rod can simply be welded into the hole which is of a size substantially equal to the diameter of the rod so that the rod is a pressfit within the hole and then welded in place.

Figure 2:
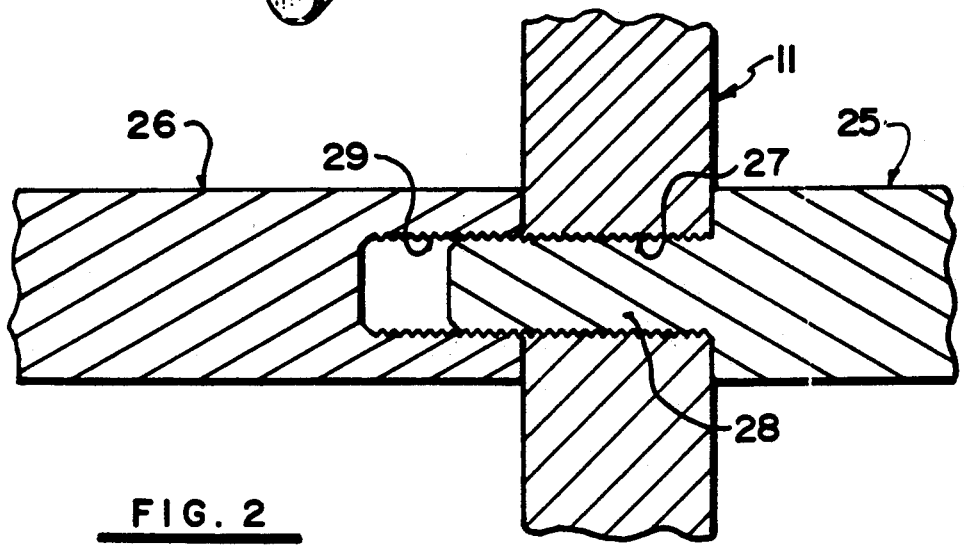
FIG. 2 is a cross-sectional view along the lines 2—2 of FIG. 1.

In an alternative preferred arrangement, as shown in FIG. 2, the rod is formed in two portions indicated respectively at 25 and 26. In this case a hole 27 is formed in the lower portion 11 at the position previously described but is of slightly smaller diameter than the outside diameter of the portions 25 and 26. The portion 25 has a male screw threaded portion 28 attached to the inner end thereof and having a length greater than the thickness of the lower portion 11. The hole 27 is screw threaded with a female screw threaded portion of a thread type to match with the male screw thread 28 so that the male screw threaded portion can be screwed into the hole from one side of the lower portion 11 leaving an end piece of the portion 28 projecting outwardly beyond the opposed side of the lower portion 11. The portion 26 of the rod includes a hole in the end face thereof at the inner end thereof indicated at 29 which is again screw threaded to form a female screw thread which can cooperate with the male screw thread of the portion 28. In this way the portion 26 can be screwed onto the end piece of the portion 28 to clamp both portions 25 and 26 to respective sides of the portion 11.

In operation, the knife is drawn through the ground in conventional manner at the conventional depth so that the rod is positioned 1.5 inches approximately from the base of the furrow which is just below the surface of the ground. The knife acts in its conventional manner to form the furrow, the rod does not interfere with the furrowing effect but acts to lift weeds from the ground on either side of the furrow to the surface of the ground to significantly improve the cultivating effect of the knife arrangement. The rod is very rugged and resistant to damage. It acts effectively in the cultivating action. The arrangement shown in FIG. 2 allows the rod to be quickly removed if the farming conditions do not require the rod be used. The rod avoids trapping and carrying any trash materials such as previous straw.

In a further alternative arrangement, a collar is welded to each side of the lower portion and a single spring steel rod is passed through the collars and an aligned hole in the lower portion. Set screws in the collars clamp the rod into place.

Since various modifications can be made in mY invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. In a deep banding knife comprising a knife element including means for mounting the element on a shank and having a leading edge facing forwardly of a direction of travel which leading edge is substantially vertical for cutting a furrow in the ground so that a vertical height of the leading edge is greater than a width of the leading edge, and a material supply duct mounted on the knife element rearwardly thereof relative to the leading edge so as to deposit said material into the furrow as the knife element is moved forwardly in the ground, the improvement of a horizontal rod member, mounting means fixedly mounting the rod member through a hole transversely through the knife element so as to extend transversely of the direction of travel and such that rod member portions project outwardly to each side of the knife element, the rod member being spaced above a lowermost point of the leading edge and below a top edge of the knife element so as to run along the ground just below the surface on either side of the furrow, said mounting means being arranged such that the rod member is held fixed against rotation relative to the knife element, such that the rod member is wholly supported solely by the mounting means, and such that the rod member portions extend from the mounting means in cantilever manner.

2. The knife according to claim 1 wherein the length of the rod member is such that the end thereof just overlaps an end of a rod member of a next adjacent knife element.

3. The knife according to claim 1 wherein the member is positioned on a knife element at a spacing of the order of 1.5 inches from the lowermost edge.

4. A knife according to claim 1 wherein the hole includes a female screw thread therein and wherein the rod member includes a first part having a male screw thread on one end thereof for fastening into the female screw thread of the hole with a portion of the male screw thread projecting outwardly from an opposed side of the knife element and wherein the rod member includes a second part having a female screw threaded opening at an end thereof for engaging over the male screw thread portion of the first part to clamp the second part against the opposed side of the element.

5. In a deep banding knife comprising a knife element being defined by a metal bar and including means for mounting the element on a shank, a leading edge of the knife element facing forwardly of a direction of travel which leading edge is substantially vertical for cutting a furrow in the ground so that a vertical height of the leading edge is greater than a width of the leading edge, and a material supply duct mounted on the knife element rearwardly so as to deposit said material into the furrow as the knife element is moved forwardly in the ground, the improvement of a horizontal rod member, mounting means fixedly mounting the rod member through a hole transversely through the knife element so as to extend transversely of the direction of travel and such that rod member portions project outwardly to each side of the knife element, the rod member being spaced above a lowermost point of the leading edge and below a top edge of the knife element so as to run along the ground just below the surface on either side of the furrow, said mounting means being arranged such that the rod member is held fixed against rotation relative to the knife element, such that the rod member is wholly supported solely by the mounting means, and such that the rod member portions extend from the mounting means in cantilever manner and such that the rod member extends through the metal bar forwardly of the material supply duct.

6. The knife according to claim 5 wherein the length of the rod member is such that the end thereof just overlaps an end of a rod member of a next adjacent knife element.

7. A knife according to claim 5 wherein the rod member is positioned on a knife element at a spacing of the order of 1.5 inches from the lowermost edge.

8. A knife according to claim 5 wherein the hole includes a female screw thread therein and wherein the rod member includes a first part having a male screw thread on one end thereof for fastening into the female screw thread of the hole with a portion of the male screw thread projecting outwardly from an opposed side of the knife element and wherein the rod member includes a second part having a female screw threaded opening at an end thereof for engaging over the male screw thread portion of the first part to clamp the second part against the opposed side of the element.

* * * * *